US012591634B2

(12) United States Patent
Niu et al.

(10) Patent No.: US 12,591,634 B2
(45) Date of Patent: Mar. 31, 2026

(54) COMPOSITE EMBEDDING SYSTEMS AND METHODS FOR MULTI-LEVEL GRANULARITY SIMILARITY RELEVANCE SCORING

(71) Applicant: Walmart Apollo, LLC, Bentonville, AR (US)

(72) Inventors: Yichuan Niu, Newark, CA (US); Peng Yang, San Jose, CA (US); Jayanth Korlimarla, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 889 days.

(21) Appl. No.: 17/163,383

(22) Filed: Jan. 30, 2021

(65) Prior Publication Data

US 2022/0245392 A1    Aug. 4, 2022

(51) Int. Cl.
| | |
|---|---|
| *G06F 18/22* | (2023.01) |
| *G06F 17/16* | (2006.01) |
| *G06F 18/2137* | (2023.01) |
| *G06F 18/214* | (2023.01) |
| *G06N 20/00* | (2019.01) |

(52) U.S. Cl.
CPC .............. *G06F 18/22* (2023.01); *G06F 17/16* (2013.01); *G06F 18/21375* (2023.01); *G06F 18/214* (2023.01); *G06N 20/00* (2019.01)

(58) Field of Classification Search
CPC .... G06F 18/22; G06F 18/2137; G06F 18/211; G06F 17/16; G06N 20/00
See application file for complete search history.

(56) References Cited

U.S. PATENT DOCUMENTS

| | | | |
|---|---|---|---|
| 11,048,759 B1 | 6/2021 | Pope et al. | |
| 2018/0204120 A1* | 7/2018 | Rei | G06N 3/04 |
| 2018/0341719 A1* | 11/2018 | Bhatia | G06N 5/01 |
| 2019/0114362 A1 | 4/2019 | Subbian et al. | |

(Continued)

FOREIGN PATENT DOCUMENTS

| | | |
|---|---|---|
| CN | 110839001 A | 7/2018 |

OTHER PUBLICATIONS

Akbik et al., "Pooled Contextualized Embeddings for Named Entity Recognition," 2019, Proceedings of NAACL-HLT 2019 (Year: 2019).*

(Continued)

*Primary Examiner* — Michael J Huntley
*Assistant Examiner* — Vincent Anton Spraul
(74) *Attorney, Agent, or Firm* — Morgan, Lewis & Bockius LLP; Manita Rawat

(57) ABSTRACT

Systems and methods for selecting items from a pool of items based on comparisons of composite embeddings are disclosed. An anchor embedding is generated for a target string. The anchor embedding is a composite embedding including at least a first initial embedding and a second initial embedding. An item embedding is obtained for each item in a pool of items. Each item embedding is a composite embedding including a first initial item embedding and a second initial item embedding. A similarity score is generated by comparing the item embedding to the anchor embedding for each item in the pool of items and a set of items is selected from the pool of items. The set of items includes a predetermined number of items in the pool of items having a highest similarity score.

20 Claims, 6 Drawing Sheets

100

Receive Target String
102

Generate Anchor Embedding
104

Compare Anchor Embedding
to Item Embeddings
106

Select Set of N Candidate Items
108

Output Set of N Candidate Items
110

(56) References Cited

U.S. PATENT DOCUMENTS

| | | | |
|---|---|---|---|
| 2019/0130202 A1 | 5/2019 | Doumbouya et al. | |
| 2019/0251184 A1 | 8/2019 | Shan et al. | |
| 2019/0251595 A1 | 8/2019 | Ordentlich et al. | |
| 2020/0035002 A1* | 1/2020 | Epasto | G06T 9/00 |
| 2020/0242507 A1* | 7/2020 | Gan | G06V 10/82 |
| 2020/0265297 A1* | 8/2020 | Pan | G06N 3/084 |
| 2020/0380403 A1* | 12/2020 | Aggarwal | G06V 10/82 |
| 2021/0073891 A1* | 3/2021 | Al Jadda | G06F 16/9038 |
| 2021/0110436 A1 | 4/2021 | Sankar et al. | |
| 2021/0392154 A1* | 12/2021 | Waplington | G06N 5/04 |
| 2022/0172805 A1* | 6/2022 | Liu | G06N 20/00 |
| 2022/0197961 A1 | 6/2022 | Baek et al. | |
| 2022/0292123 A1 | 9/2022 | Hoppe | |
| 2023/0044463 A1 | 2/2023 | Woolf | |

OTHER PUBLICATIONS

Thirumuruganathan et al., "Deep Learning for Blocking in Entity Matching: A Design Space Exploration," Jul. 2021, https://doi.org/10.14778/3476249.3476294 (Year: 2021).*

Ristoski et al., "A Machine Learning Approach for Product Matching and Categorization," 2016, doi.org/10.3233/SW-180300 (Year: 2016).*

Bordawekar, Rajesh et al., "Enabling Cognitive Intelligence Queries in Relational Databases using Low-dimensional Word Embeddings", arXiv:1603.07185v1, Mar. 23, 2016, 12 pages.

Trabelsi, Eval, "Powering SQL With Machine Learning Capabilities", found at:: https://towardsdatascience.com/powering-sql-with-machine-learning-capabilities-24eba7d0914, Nov. 15, 2019, 7 pages.

Yin, Pencheng et al., "Neural Enquirer: Learning to Query Tables", ARxIV:1512.00965V1, Dec. 3, 2015, 17 pages.

Nikolaev, Fedor et al., "Joint Word and Entity Embeddings for Entity Retrieval from a Knowledge Graph", Springer Natur Switzerland AG, 2020 found at: https://doi.org/10.1007/978-3-030-45439-5_10, pp. 141-155.

Radlinski, Filip et al., "Optimizing Relevance and Revenue in Ad Search: A Query Substitution Approach", The 31st Annual International ACM SIGIR Conference (SIGIR'08), Jul. 20-24, 2008, Singapore, 8 pages.

Zamani, Hamed et al., "Estimating Embedding Vectors for Queries", Proceedings of the 2016 ACM International Conference on the Theory of Information Retrieval (ICTIR '16), Sep. 12-16, 2016, Newark, DE, 10 pages.

Data Science Stack Exchange, "where to store embeddings for similarity search," https://datascience.stackexchange.com/questions/63787/where-to-store-embeddings-for-similarity-research, (Year: 2019), 3 pages.

Hu et al., "Hashing with Angular Reconstructive Embeddings," IEEE Transactions on Image Processing, vol. 27, No. 2, Feb. 2018, pp. 545-555.

* cited by examiner

100

Receive Target String
102

Generate Anchor Embedding
104

Compare Anchor Embedding
to Item Embeddings
106

Select Set of N Candidate Items
108

Output Set of N Candidate Items
110

200

Generate Sets of Initial Embeddings
202

Store Sets of Initial Embeddings
in Associated Database(s)
204

Generate Composite Embedding(s)
based on Embedding Parameters
206

Provide Composite Embedding(s)
to Embedding Comparison Process
208

COMPOSITE EMBEDDING SYSTEMS AND METHODS FOR MULTI-LEVEL GRANULARITY SIMILARITY RELEVANCE SCORING

TECHNICAL FIELD

This application relates generally to composite embedding and, more particularly, to similarity relevance scoring using composite embeddings.

BACKGROUND

Computer-implemented models, such as machine learning models, that convert data elements into embeddings (e.g., vector embeddings) allow individual embeddings to be provided as input to other automated processes. In some instances, individual embeddings may be used to compare two or more items in a set of items. One known class of model embedding includes word embeddings that convert (or map) letters, words, phrases, etc. to vectors of real numbers. One example of such an embedding is the "word2vec" embeddings.

Current systems utilize individual vector embeddings for various tasks, such as machine learning or other automated tasks. Individual embeddings may reflect certain information related to items being compared while omitting other information. Applying multiple similarity comparisons based on multiple embeddings of different dimensions increases processing time and complexity of a system.

SUMMARY

In various embodiments, a system is disclosed. The system includes a non-transitory memory having instructions stored thereon and a processor configured to read the instructions. The processor is configured to generate an anchor embedding for a target string. The anchor embedding is a composite embedding including at least a first initial embedding and a second initial embedding. The processor is further configured to obtain an item embedding for each item in a pool of items. Each item embedding is a composite embedding included a first initial item embedding and a second initial item embedding. The processor is further configured to generate a similarity score for each item in the pool of items based on a comparison of the item embedding to the anchor embedding and select a set of items from the pool of items. The set of items includes a predetermined number of items in the pool of items having a highest similarity score.

In various embodiments, a non-transitory computer readable medium having instructions stored thereon is disclosed. The instructions, when executed by a processor cause a device to perform operations including generating an anchor embedding for a target string, obtaining an item embedding for each item in a pool of items, generating a similarity score for each item in the pool of items based on a comparison of the item embedding to the anchor embedding, and selecting a set of items from the pool of items. The anchor embedding is a composite embedding including at least a first initial embedding and a second initial embedding. Each item embedding is a composite embedding included a first initial item embedding and a second initial item embedding. The set of items includes a predetermined number of items in the pool of items having a highest similarity score.

In various embodiments, a computer-implemented method is disclosed. The computer-implemented method includes the steps of generating an anchor embedding for a target string, obtaining an item embedding for each item in a pool of items, generating a cosine similarity score between each item embedding and the anchor embedding, and selecting a set of items from the pool of items. The anchor embedding is a generated by concatenating a first normalized initial embedding and a second normalized initial embedding. Each item embedding includes a first normalized initial item embedding concatenated to and a second normalized initial item embedding. The set of items includes a predetermined number of items having a highest cosine similarity.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
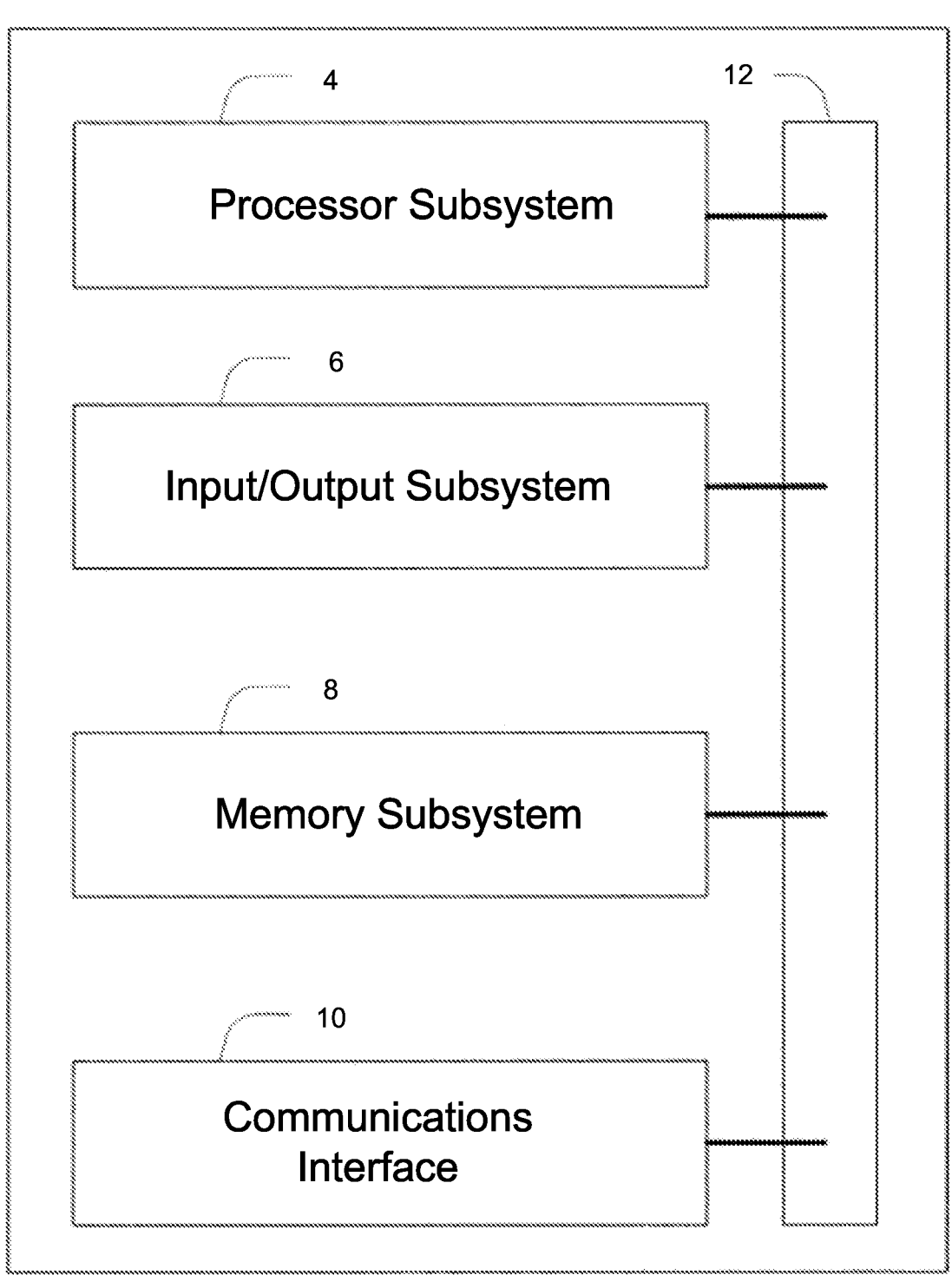
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In various embodiments, systems and methods of selecting items from a predetermined pool of items using composite embeddings are disclosed. As used herein, the term composite embedding refers to an embedding representative of an item (e.g., a string, product, database entry, inventory item, etc.) that is generated by combining a plurality of sub-embeddings. In some embodiments, a composite embedding is generated by concatenating one or more initial embeddings. An anchor embedding (e.g., a composite embedding generated for a target) is compared to a plurality of item embeddings (e.g., embeddings generated for each item in a pool of items). A set of N items is selected from the pool of items based on the composite embedding comparison. The set of items may be used, for example, to select content for display within a network environment, such as an e-commerce environment.

In various embodiments, systems and methods of generating a composite embedding are disclosed. Two or more sets of initial embeddings may be generated for a pool of items. Each set includes an initial item embedding for each item in the pool of items generated using a specific embedding generation model. The sets of initial embeddings may be stored in various databases. Composite embeddings may be generated by concatenating item embeddings for an item selected from two or more of the sets of initial embeddings stored in the appropriate databases. Item embeddings or anchor embeddings may be generated in real-time based on one or more embedding parameters, such as, for example, initial embeddings to be used and/or embedding weightings to be applied.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferro-electric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processing subsystem 4.

Figure 2:
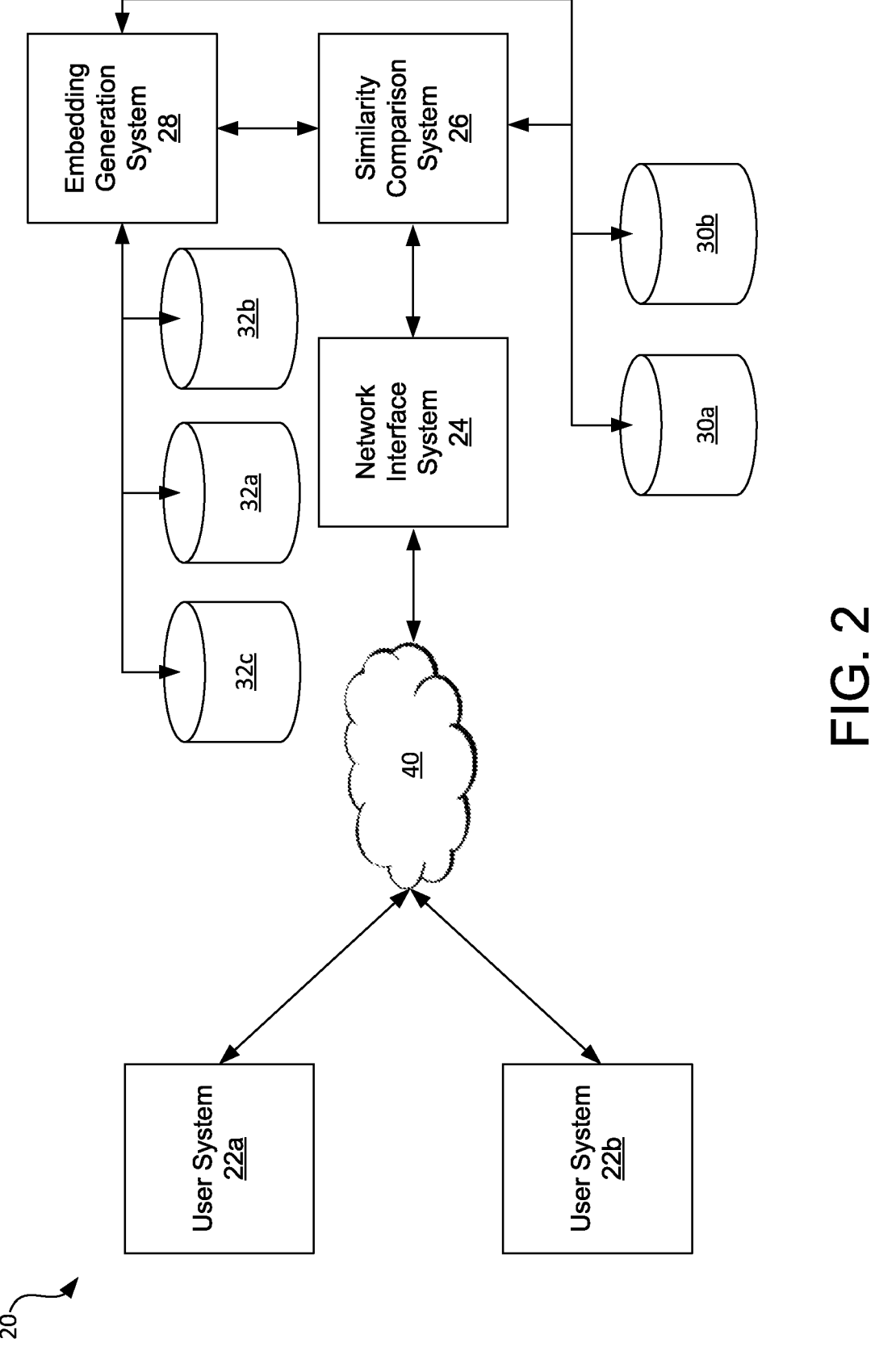
FIG. 2 illustrates a network environment configured to provide sets of candidate items from a predetermined pool of items based on a comparison between composite embeddings, in accordance with some embodiments.

FIG. 2 illustrates a network environment 20 configured to provide sets of candidate items from a predetermined pool of items based on a comparison between composite embeddings, in accordance with some embodiments. The network environment 20 may include, but is not limited to, one or more user systems 22a, 22b, a network interface system 24, a similarity comparison system 26, an embedding generation system 28, one or more item databases 30a, 30b, one or more embedding databases 32a, 32b, 32c, and/or any other suitable system. Each of the systems 22a-28 and/or the databases 30a-32c may include a system as described above with respect to FIG. 1. The systems 22a-28 and/or the databases 30a-32c may be in signal (e.g., data) communication through one or more networks, such as network 40. Although embodiments are illustrated herein having discrete systems, it will be appreciated that one or more of the illustrated systems may be combined into a single system configured to implement the functionality and/or services of each of the combined systems. For example, although embodiments are illustrated and discussed herein including each of a network interface system 24, a similarity comparison system 26, and an embedding generation system 28, it will be appreciated that these systems may be combined into a single logical and/or physical system configured to perform the functions and/or provide services associated with each of the individual systems. It will also be appreciated that each of the illustrated systems may be replicated and/or split into multiple systems configured to perform similar functions and/or parts of a function.

In some embodiments, the network interface system 24 is configured to provide a network interface to the one or more user systems 22a, 22b. The network interface may include any suitable type of network interface, such as, for example, an e-commerce interface, a search interface, an inventory interface, etc. Although embodiments are discussed herein with reference to an e-commerce network interface, it will be appreciated that the disclosed systems and methods are applicable to any interface including sets of items that may be converted into embeddings for purposes of selection or ranking.

In some embodiments, the network interface 24 is configured to receive a target input from a user system 22a, 22b. The target input may include, for example, a search query, item name, category type, etc. The target input may include any suitable format, such as, for example, an alphanumeric string. In some embodiments, the target input includes an alphanumeric search string. For example, in an e-commerce environment, a user system 22a, 22b may provide a search string to the network interface system 24. Although embodiments are discussed herein including a target alphanumeric search string, it will be appreciated that the disclosed systems and methods may be applied to any system using a target string input to identify items in a set of items.

In some embodiments, the network interface system 24 is in signal (e.g., data) communication with a similarity comparison system 26. The similarity comparison system 26 is configured to identify a set of candidate items based on the received target input. For example, in some embodiments, the similarity comparison system 26 utilizes a composite embedding generated for the target input (referred to herein as an "anchor embedding") and composite embeddings generated for each item in a pool of items (referred to herein as "item embeddings") to identify a set of candidate items from the pool of items. As discussed in greater detail below, in some embodiments, the identification of candidate items is based on a similarity comparison between the anchor embedding and each of the item embeddings.

In some embodiments, the similarity comparison system 26 is in signal (e.g., data) communication with one or more item databases 30a, 30b containing at least one item embedding for each item in the pool of items. In some embodiments, the similarity comparison system 26 is configured to load an item embedding for each item in the item database(s) 30a, 30b when performing a similarity comparison. In some embodiments, the similarity comparison system is configured to load only a subset of the item embeddings in the item database(s) 30a, 30b. For example, in some embodiments, item embedding may be sorted by predefined categories, geographic areas, etc. and the comparison system 26 may use only one or more of the predefined categories.

In some embodiments, the network interface system 24 and/or the similarity comparison system 26 are in signal (e.g., data) communication with an embedding generation system 28. The embedding generation system 28 may be configured to generate initial embeddings and/or composite embeddings, as discussed in greater detail below. For example, in some embodiments, the embedding generation system 28 is configured to generate an anchor embedding for a target input received at the networking interface system 24 by concatenating a first initial embedding generated by a first model to a second initial embedding generated by a second model. In some embodiments, a composite embedding has a size (e.g., dimension) equal to the total size of the initial embedding(s) used to generate the composite embedding. For example, and as discussed in greater detail below, in some embodiments, a first initial embedding having a first size X and a second initial embedding have a second size Y are concatenated to generate a composite embedding having size X+Y.

In some embodiments, the embedding generation system 28 is configured to generate one or more initial embeddings and/or may receive generated initial embeddings from a separate system or database. For example, in some embodiments, the embedding generation system 28 is configured to generate a first initial embedding having a first size (e.g., a first number of dimensions) and a second initial embedding having a second size (e.g. a second number of dimensions). Each initial embedding may be generated using any suitable embedding generation process. For example, in some embodiments, a first initial embedding is generated by a first trained network configured to implement a "fine-grain" embedding process, such as a two-tower model, and a second initial embedding is generated by a second trained network configured to implement a "coarse-grain" embedding process, such as a word2vec model. It will be appreciated that different networks may be configured with the same model to produce different output vectors based on, for example, different initial parameters of the model and/or the training data used to configure the model.

In some embodiments, the embedding generation system 28 is in signal communication with a set of embedding databases 32a-32c. Each of the embedding databases 32a-32c is configured to store a set of initial embeddings. As discussed in greater detail below, in some embodiments the embedding generation system 28 is configured to generate composite embeddings by combining initial embedding(s) loaded from one or more embedding databases 32a-32c. For example, in some embodiments, a first composite embedding may be generated by concatenating an initial embedding stored in the first embedding database 32a and an initial embedding stored in a second embedding database 32b at a first time and a second composite embedding may be generated by combining an initial embedding stored in the first embedding database 32a and an initial embedding stored in a third embedding database 32c at a second time. As discussed below, composite embeddings may be generated prior to and/or simultaneous (e.g., in "real-time") with a comparison of the item embedding to the anchor embedding.

Figure 3:
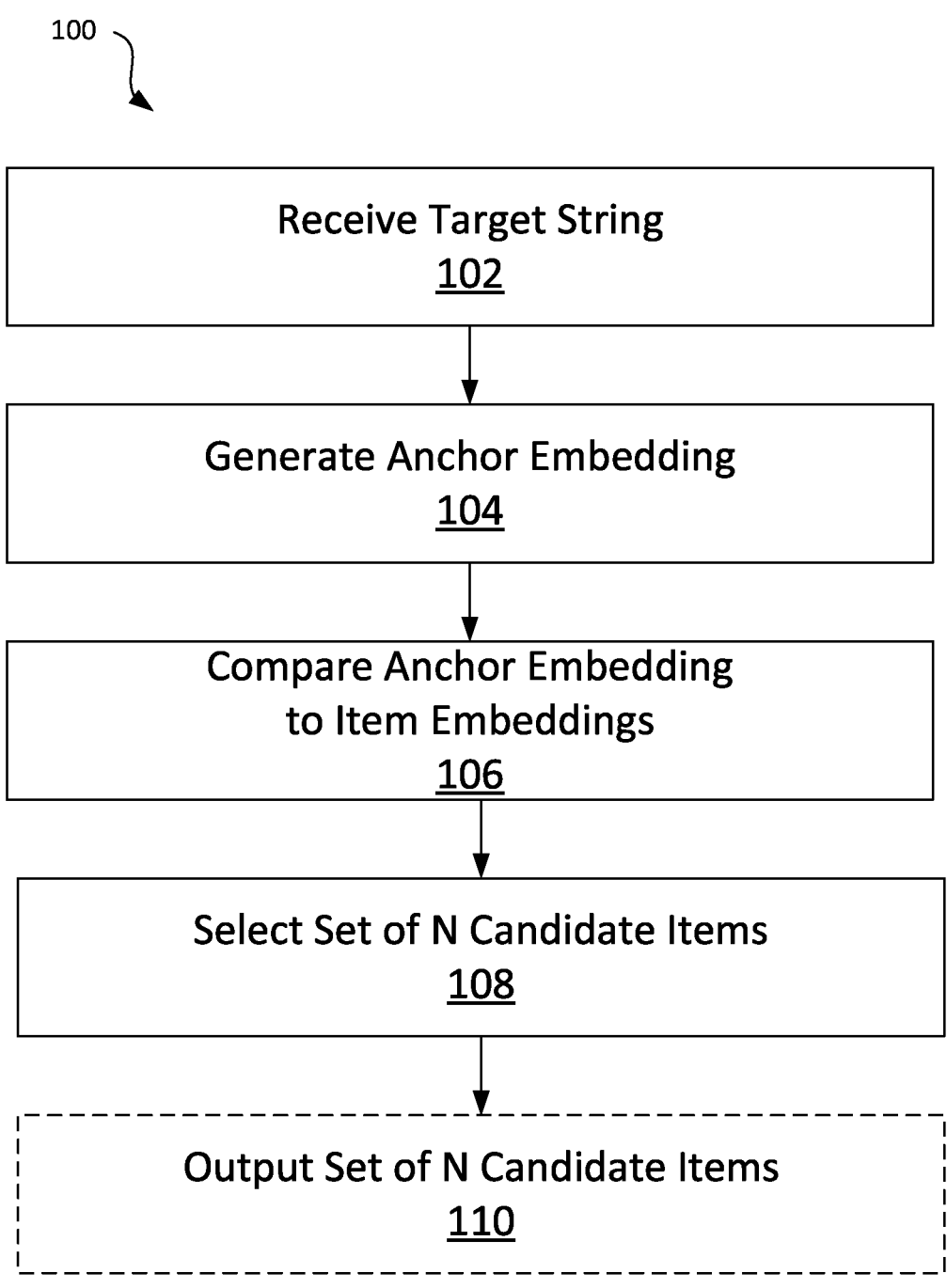
FIG. 3 is a flowchart illustrating a method of selecting a set of items from a predetermined pool using composite embeddings, in accordance with some embodiments.
Figure 4:
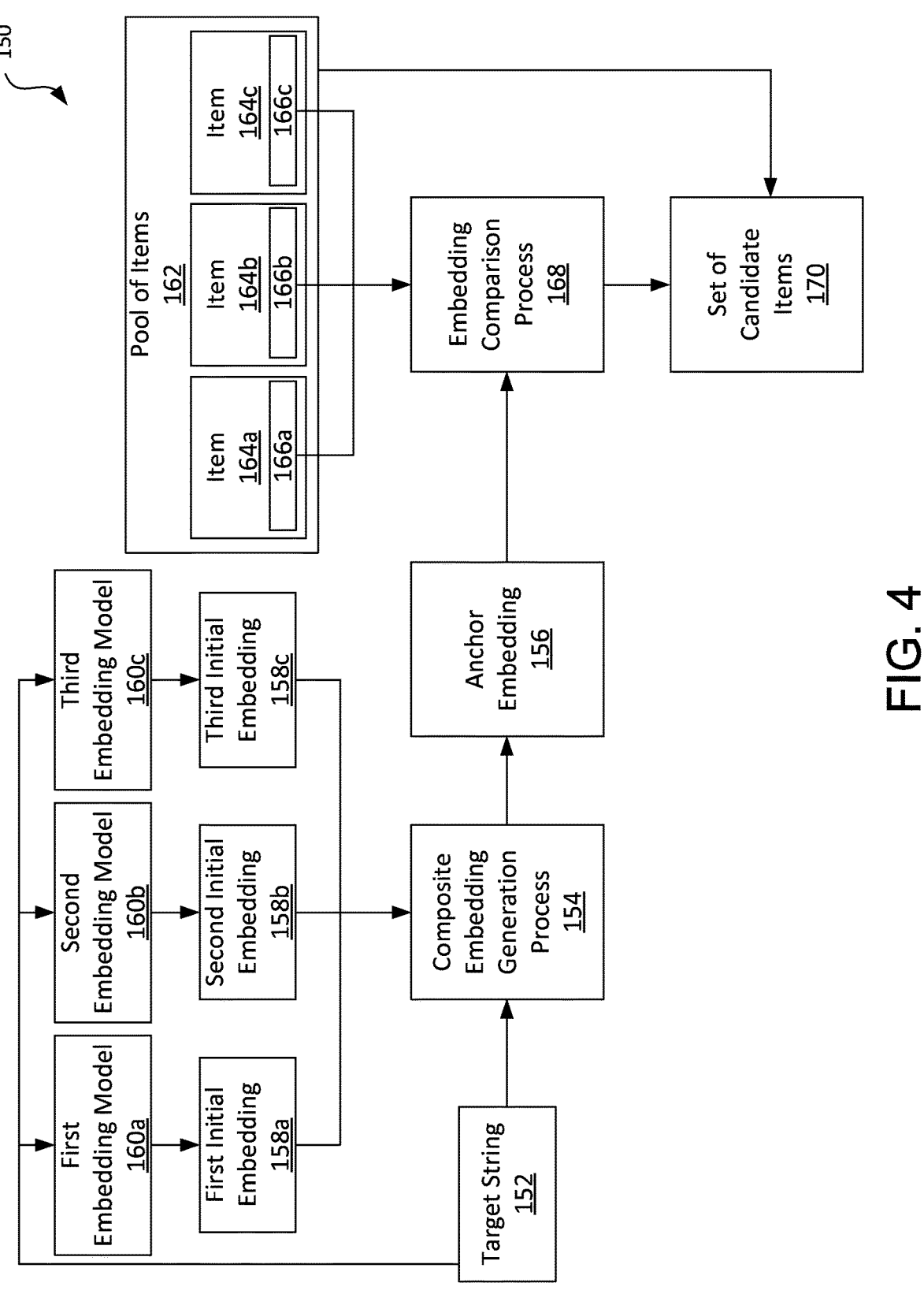
FIG. 4 is a process flow illustrating various steps of the method of selecting a set of items from a predetermined pool using composite embeddings illustrated in FIG. 3, in accordance with some embodiments.

FIG. 3 is a flowchart illustrating a method 100 of selecting content from a predetermined pool using composite embeddings, in accordance with some embodiments. FIG. 4 is a process flow 150 illustrating various steps of the method 100 of selecting content from a predetermined pool using composite embeddings illustrated in FIG. 3, in accordance with some embodiments. At step 102, a target string 152 is received. The target string 152 may be received from any suitable system, such as, for example, a user system 22a, 22b. In some embodiments, the target string 152 includes an alphanumeric string, although it will be appreciated that any suitable string of characters may be provided. The target string 152 may include any suitable string, such as, for example, a search query, an item identifier, a stock-keeping unit (SKU), and/or any other suitable alphanumeric string.

At step 104, an anchor embedding 156 is generated for the target string 152. In some embodiments, the anchor embedding 156 is generated by a composite embedding generation process 154 configured to be implemented by any suitable system, such as, for example, the embedding generation system 28 discussed above. In some embodiments, the composite embedding generation process 154 is configured to concatenate one or more initial embeddings 158a-158b to generate the anchor embedding 156. The anchor embedding 156 and/or the initial embeddings 158a-158b may be pre-generated and/or may be generated directly from the received target string 152.

In some embodiments, the anchor embedding 156 is generated directly based on the received target string 152. For example, in some embodiments, the target string 152 is provided to a plurality of embedding models 160a-160c. Each of the plurality of embedding models 160a-160c is configured to generate an initial embeddings 158a-158c for the target string 152. Each of the plurality of embedding models 160a-160c may be configured to implement an embedding conversion model. For example, in various embodiments, one or more of the embedding models may be configured to implement a word embedding model (e.g., word2vec), a deep neural network (DNN) model (e.g., two-tower neural network), and/or any other suitable machine learning model. It will be appreciated that the disclosed systems and methods may be used with any embedding model configured to generate an initial embedding 158a-158c from a received target string 152. Although embodiments are illustrated herein including three initial embeddings 158a-158c, it will be appreciated that a composite embedding, such as the anchor embedding 156, can be generated from a lesser (e.g., two) or greater (e.g., 3, 4, 5, etc.) number of initial embeddings.

In some embodiments, one or more of the initial embeddings 158a-158c may be loaded from an embedding database, for example, embedding databases 32a-32c discussed above. In such embodiments, the embedding generation system 28 (and/or any other suitable system) may be configured to pre-generate a set of initial embeddings 158a-158c, for example, a set of initial embeddings 158a-158c for a set of the most common or most used target strings (referred to herein as a set of "hot strings"). When a string is added to the set of hot strings, the embedding generation system 28 may generate initial embeddings 158a-158c and/or an anchor embedding 156 for the added string based on the embedding models 160a-160c and/or the composite embedding generation process. The generated embeddings 156, 158a-158c may be stored in one or more databases. When a target string is received, the associated embeddings 156, 158a-158c may be loaded from the database(s).

After generating and/or loading the initial embeddings 158a-158c, the composite embedding generation process 154 generates an anchor embedding 156. The composite embedding generation process 154 may be configured to generate an anchor embedding 156 for each received target string 152 and/or may be configured to load a pre-generated anchor embedding 156 from a database. In some embodiments, an anchor embedding is generated by concatenating one or more initial embeddings 158a-158c. For example, anchor embedding A may be generated by concatenating a first initial embedding $A_1$ and a second initial embedding $A_2$:

$$A=[A_1,A_2], \text{where}$$

$$A_1=[A_{1_1},A_{1_2},A_{1_3}, \ldots ,A_{1_m}]$$

$$A_2=[A_{2_1},A_{2_2},A_{2_3}, \ldots ,A_{2_n}]$$

where m and n are the number of dimensions in each initial embedding $A_1$, $A_2$. It will be appreciated that the total dimensions in the anchor embedding A (x) is equal to the number of dimensions in the first initial embedding $A_1$ (m) plus the number of dimensions in the second initial embedding $A_2$ (n), i.e., x=m+n.

In some embodiments, the norm of each initial embedding is used to generate the anchor embedding 156. To continue the example from above, in some embodiments the anchor embedding 156 is the norm of embedding A:

$$\overline{A}=[\overline{A_1},\overline{A_2}]$$

where $\overline{A_1}$ and $\overline{A_2}$ are normalized such that the L2 norm=‖1‖. It will be appreciated that step 104 (and/or portions of step 104) may be performed substantially in real-time with (i.e., sequentially or simultaneously) with the other steps of the method 100 and/or may be performed prior to execution of the other steps of the method 100.

In some embodiments, an anchor embedding 156 for one or more potential target strings 152 may be pre-generated by a system, such as the embedding generation system 28. For example, a system, such as the network interface system 24, may maintain a set of "hot strings" representative of the N most common strings received by the system. When a string is added to the set of "hot strings," the embedding generation system 28 may generate a composite embedding (i.e., an anchor embedding) for the added target string. The generated anchor embedding may be stored in a database, such as a hot string database. When a target string 152 is received, it may be compared to the set of hot strings, based on, for example, a simple text comparison. If a match is found, the anchor embedding 156 for the received target string 152 may be loaded from the database.

At step 106, the anchor embedding 156 is compared to an item embedding 166a-166c for each item 164a-164c in a predetermined pool of items 162. In some embodiments, each item embedding 166a-166c includes a composite embedding generated from two or more initial embeddings generated for each item (see FIGS. 5-6). The initial embeddings are generated using the same models used to generate the initial embeddings 158a-158c of the anchor embedding 156. The set of item embeddings 166a-166c may be generated prior to execution of the method 100 (e.g., offline or pre-generated) and/or may be generated during execution of the method 100 (e.g., online or in real-time). In some embodiments, an item embedding B is generated by concatenating a first initial item embedding $B_1$ and a second initial item embedding $B_2$:

$$B=[B_1,B_2]$$

$$B_1=[B_{1_1},B_{1_2},B_{1_3}, \ldots ,B_{1_m}]$$

$$B_2=[B_{2_1},B_{2_2},B_{2_3}, \ldots ,B_{2_n}]$$

where m and n are the number of dimensions in each initial item embedding $B_1$, $B_2$. It will be appreciated that the total dimensions in the item embedding B (x) is equal to the number of dimensions in the first initial embedding $B_1$ (m) plus the number of dimensions in the second initial embedding $B_2$ (n), i.e., x=m+n.

In some embodiments, and similar to the anchor embedding 156, the norm of each initial embedding $B_1$, $B_2$ are used to generate the item embedding B:

$$\overline{B}=[\overline{B_1},\overline{B_2}]$$

where $\overline{B_1}$ and $\overline{B_2}$ are normalized such that the L2 norm=$\|1\|$. It will be appreciated that, in some embodiments, the same embedding models 160a-160c are used to generate the initial embeddings for both the anchor embedding 156 and the item embeddings 166a-166c. Similarly, it will be appreciated that, in some embodiments, the same composite embedding generation process 154 is used to generate both the anchor embedding 156 and the item embeddings 166a-166c.

In some embodiments, an item embedding 166a-166c for each item may be pre-generated by a system, such as the embedding generation system 28. For example, when an item 164c is added to the pool of items 162, the embedding generation system 28 may generate an item embedding 166c for the added item. The generated item embedding 166c may be stored in a database, such as an item database. Item embeddings 166a-166c are loaded from the database for comparison to each anchor embedding 156. In other embodiments, and as discussed below, item embeddings 166a-166c may be generated in real-time based on one or more received parameters.

In some embodiments, the anchor embedding 156 is compared to each of the item embeddings 166a-166c using a cosine similarity comparison:

$$\cos_{sim}(A, B) = \frac{A \cdot B}{\|A\| \cdot \|B\|}$$

The cosine similarity generates a value between $-1$ and 1, where the greater the value, the higher the similarity. The cosine similarity may be simplified by using the norm of each embedding:

$$\cos_{sim}(\overline{A}, B) = \frac{\overline{A} \cdot B}{\|\overline{A}\| \cdot \|B\|} = \overline{A} \cdot B$$

as, $\|\overline{A}\| \cdot \|\overline{B}\|=1$. The $\cos_{sim}(\overline{A},\overline{B})$ can be expressed as the cosine similarity of each of the underlying initial embeddings used to generate the respective composite embedding 158, 166a-166c. For example, where two initial embeddings are used to generate each of the anchor embedding 156 and the item embeddings 166a-166c, the cosine similarity may be expressed as:

$$\cos_{sim}(\overline{A},\overline{B})=\cos_{sim}(\overline{A_1},\overline{B_1})+\cos_{sim}(\overline{A_2},\overline{B_2})$$

The cosine similarity can be generically represented for any number of underlying initial embeddings as:

$$cos_{sim}(\overline{A}, B) = \sum_{i=1}^{n} \cos_{sim}(\overline{A_i}, B_i)$$

where n is the number of initial embeddings used to generate the composite embeddings 156, 166a-166c.

In some embodiments, weighting factors are applied to the anchor embedding 156 and to each item embedding 166a-166c. The weighting factors allow for adjustments in the weight given to each of the initial embeddings used to generate the composite embeddings 156, 166a-166c. As one example, in some embodiments, a first initial embedding may be generated by a model configured to provide a "fine-grain" embedding, e.g., an embedding representative of specific information about an item or term, and a second initial embedding may be generated by a model configured to provide a "coarse-grain" embedding, e.g., an embedding representative of general information about categories, groups, etc. In some embodiments, weighting factors may be applied to increase the weight of the "fine-grain" embedding and decrease the weight of "coarse-grain" embedding (or to provide the opposite).

In some embodiments, weighting factors may be applied directly to each composite embedding 156, 166a-166c to generate weighted composite embeddings. As one example, a weighted norm of embedding A may be represented as $A_w$, where:

$$\overline{A_w}=[X_1 \cdot \overline{A_1}, X_2 \cdot \overline{A_2}, \ldots, X_n \cdot \overline{A_n}]$$

where $X_n$ is the weighting factor for $n^{th}$ initial embedding such that $$\sum_{i=1}^{n} X_n = 1.$$

In some embodiments, weighting factors may be applied to the cosine similarity calculation. For example, where two initial embeddings are used to generate each of the anchor embedding 156 and the item embeddings 166a-166c, the weighted cosine similarity may be expressed as:

$$\cos_{sim}(\overline{A},\overline{B})=X_1 \cos_{sim}(\overline{A_1},\overline{B_1})+X_2 \cos_{sim}(\overline{A_2},\overline{B_2})$$

where $X_1$ and $X_2$ are weighting factors for each of the underlying initial embeddings. The cosine similarity can be generically represented for any number of underlying initial embeddings as:

$$\cos_{sim}(\overline{A}, \overline{B}) = \sum_{i=1}^{n} X_n \cos_{sim}(\overline{A_i}, B_i)$$

where n is the number of initial embeddings used to generate the composite embeddings 156, 166a-166c and X is the weighting factor for $n^{th}$ initial embedding such that $$\sum_{i=1}^{n} X_n = 1.$$

At step 108, a set of N candidate items 170 is identified from the pool of items 162. In some embodiments, the set of N candidate items 170 includes the N items 164a-164c having the highest similarity score for an associated item embedding 166a-166c compared to the anchor embedding 156. For example, in some embodiments, the target string 152 is a search query provided by a user system 22a, 22b. The set of N candidate items 170 will include the items having the highest similarity to the search query, as determined by the comparison between each item embedding 166a-166c and the anchor embedding 156. The set of N items 170 may be identified by arranging the similarity scores generated in step 106 in descending order and selecting the top N results, although it will be appreciated that other selection mechanism may be applied.

At step 110, the set of N candidate items 170 is provided to a system for further processing. For example, in various embodiments, additional ranking, sorting, and/or selection processes or criteria may be applied to the set of N candidate items 170 to identify a set of M items for display to a user. In other embodiments, the set of N candidate items 170 may be used to populate various elements in a user interface, such as, for example, various containers within a user interface.

Figure 5:
FIG. 5 is a flowchart illustrating a method of generating a composite embedding from a plurality of initial embeddings based on one or more parameters, in accordance with some embodiments.
Figure 5:
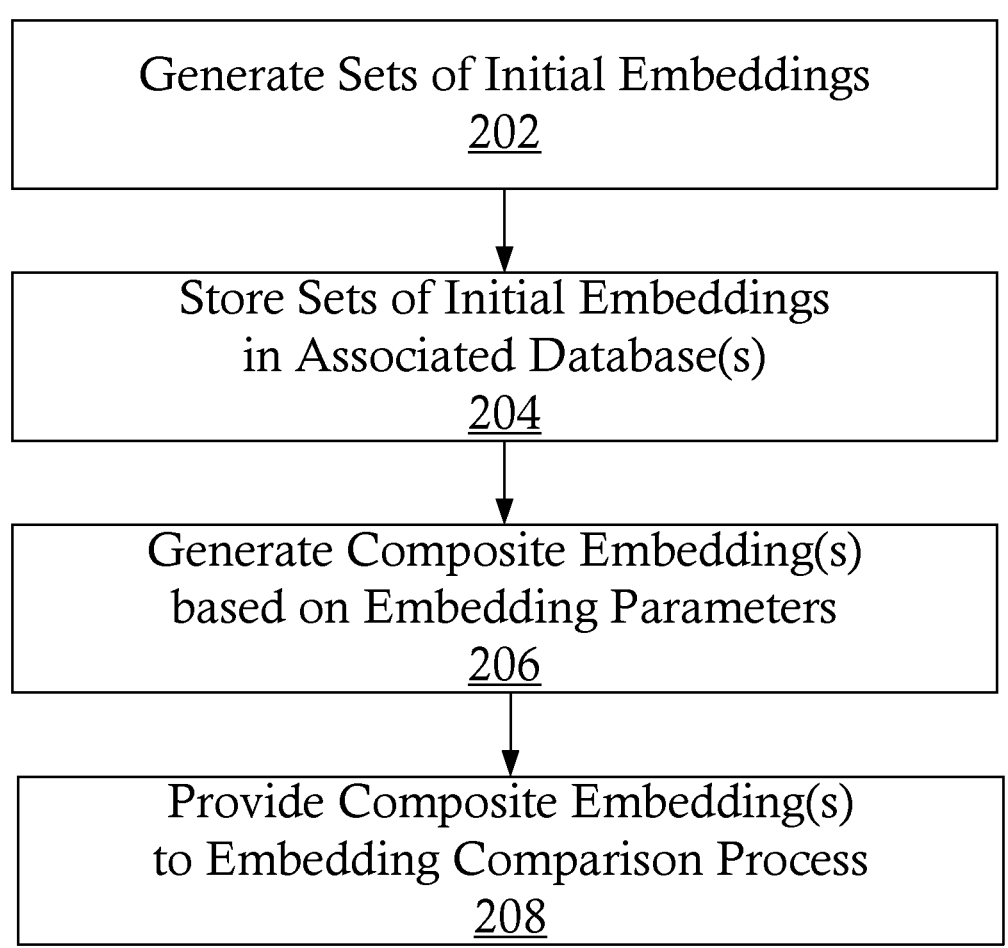
Figure 6:
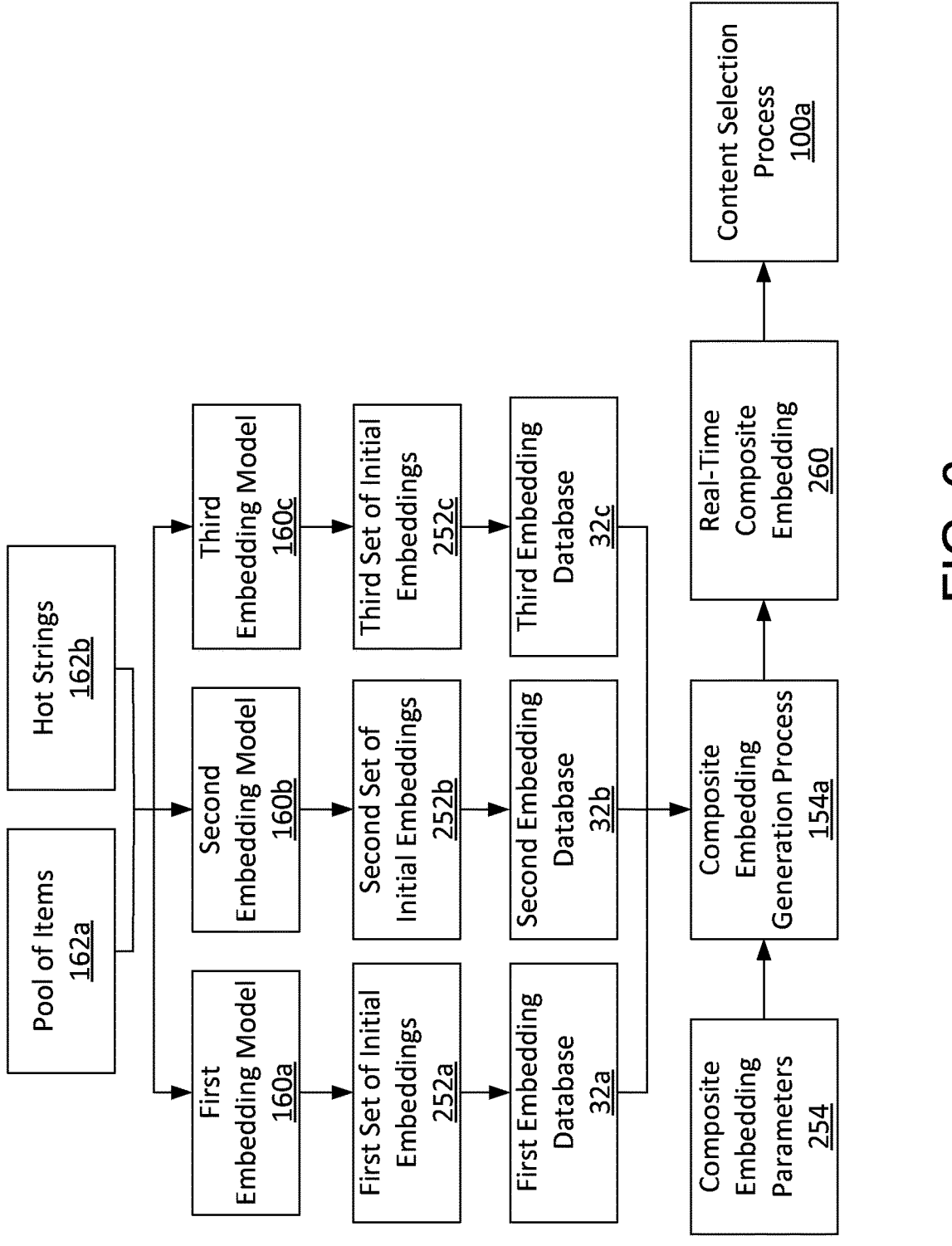
FIG. 6 is a process flow illustrating various steps of the method of generating a composite bedding illustrated in FIG. 5, in accordance with some embodiments.

FIG. 5 is a flowchart illustrating a method 200 of generating a concatenated embedding from a plurality of initial embeddings based on one or more parameters, in accordance with some embodiments. FIG. 6 is a process flow 250 illustrating various steps of the method 200 illustrated in FIG. 5, in accordance with some embodiments. At step 202, sets of initial embeddings 252a-252c are generated. Each set of initial embeddings 252a-252c may be generated by any suitable system, such as, for example, an embedding generation system 28.

In some embodiments, each set of initial embeddings 252a-252c is generated using a different embedding generation model 160a-160c. The embedding generation models 160a-160c may be configured to implement a predetermined embedding generation model trained using a predetermined set of training data. For example, as one non-limiting example, the first embedding generation model 160a may include a two-tower embedding model and each of the second and third embedding generation models 160b, 160c may include a word2vec embedding model. The second and third embedding generation models 160a, 160b are trained using different training data, such that the use of the same underlying model produces different output embeddings. In some embodiments, the second and third embedding generation models 160a, 160b are configured to receive different inputs and generate different sets of embedding outputs 252b-252c.

In some embodiments, the initial embeddings in each set of initial embeddings 252a-252c are normalized. For example, in some embodiments, each embedding is normalized such that the L2 norm is equal to 1. Although embodiments are discussed herein including normalized embeddings, it will be appreciated that initial and/or composite embeddings may be generated without normalization, in accordance with some embodiments.

At step 204, each set of initial embeddings 252a-252c is stored in a database 32a-32c. It will be appreciated that any suitable database may be used to store each set of initial embeddings 32a-32c. For example, in some embodiments, a first database 32a having a first structure (e.g., a Cassandra database) may be used to store the first set of initial embeddings 252a, a second database 32b having a second structure (e.g., MySQL database) may be used to store the second set of initial embeddings 252b, and a third database 32c having the second structure (e.g., MySQL database) may be used to the store the third set of initial embeddings 252c. Although embodiments are discussed herein including separate databases and/or database structures, it will be appreciated that each set of initial embeddings 252a-252c may be stored in any number of databases 32a-32c using any number of database schemas and/or multiple sets of initial embeddings 252a-252c may be stored in a single database.

In some embodiments, sets of initial embeddings 252a-252c are generated for a set of known items, such as, for example, a pool of items 162a and/or a pool of hot strings 162b. The set of items 162a may include a predetermined set of candidate items for display within a network interface. For example, and without limitation, the pool of items 162a may include inventory items, products, advertisements, services, and/or any other suitable item. Similarly, the set of hot strings may include a set of hot (e.g., popular or frequently used) strings received by a network interface system 24, such as, without limitation, a search query, an item query, an item identifier, a SKU, etc. It will be appreciated that the pool of items 162a and/or the set of hot strings 162b may correspond to any suitable aspect of the network environment.

In some embodiments, the sets of initial embeddings 252a-252c are generated for each item in the pool of items 162a. As one example, in the context of an e-commerce environment, the pool of items 162a may include advertisements, inventory items, and/or any other item that may be identified in response to a search query. Sets of initial embeddings 252a-252c are generated by each of the initial embedding models 160a-160c for each item in the pool of items 162a and the sets of initial embeddings 252a-252c are stored in a corresponding database 32a-32c.

In some embodiments, the pool of items 162a and/or the set of hot strings 162b may be updated periodically, such as, for example, every hour, every day, etc. For each update, some or all of the sets of initial embeddings 252a-252c may be updated. In some embodiments, a subset of the pool of items 162a, a subset of the hot strings 162b, and/or a subset of each set of initial embeddings 252a-252c may be stored in an active database and updated periodically.

At step 206, one or more composite embeddings 260 are generated based on a set of composite embedding parameters 254. The set of composite embedding parameters 254 may be received from any suitable source. For example, in various embodiments, the set of composite embedding parameters 254 may be based on interface design parameters, advertising parameters, search parameters, and/or any other suitable parameters. In some embodiments, the set of composite embedding parameters 254 includes an identification of initial embeddings 252a-252c to be used to generate the composite embedding 260 and/or a set of weighting parameters for weighting each of the initial embeddings 252a-252c.

As one example, a first set of composite embedding parameters 254, received at a first time $t_1$, may indicate the first set of initial embeddings 252a and the second set of initial embeddings 252b are to be used for generation of composite embeddings 260. The first set of composite embedding parameters 254 further specifies associated weights for each initial embedding 252a, 252b in the real-time composite embedding 260. A second set of composite embedding parameters 254, received at a second time $t_2$, may indicate the first set of initial embeddings 258a and the third set of initial embeddings 252c are to be used for generation of composite embeddings 260. The second set of composite embedding parameters 254 further specifies associated weights for each set of initial embeddings 252a, 252c in the composite embedding 260. It will be appreciated that any combination of initial embeddings 252a-252c and/or any weighting parameters may be used to generate a composite embedding 260.

In some embodiments, the composite embeddings 260 are generated according to the concatenation process described above in conjunction with FIGS. 3-4 as modified by the composite embedding parameters 254. For example, if the set of composite embedding parameters 254 indicates that composite embeddings 260 should be generated using a first set of initial embeddings 252a having a first weighting X and a second set of initial embeddings 252b having a second weighting Y, real-time composite embeddings B may be generated as:

$$B=[X \cdot B_1, Y \cdot B_2]$$

where $B_1$ and $B_2$ are the first and second initial embeddings 252a, 252b, respectively, and X+Y=1. The initial embeddings 252a, 252b used to generate the real-time composite embedding(s) 260 are loaded from the associated database 32a-32b as needed. As discussed above, in some embodiments, the sets of initial embeddings 252a-252c may include normalized embeddings, such that:

$$B=[X \cdot \overline{B_1}, Y \cdot \overline{B_2}]$$

As another example, if the set of composite embedding parameters 254 indicates that composite embeddings 260 should be generated using a first set of initial embeddings 252a having a first weighting X and a third set of initial embeddings 252c having a second weighting Y, concatenated embeddings B may be generated as:

$$B=[X \cdot B_1, Y \cdot B_2]$$

where $B_1$ and $B_2$ are the first and third initial embeddings 252a, 252c, respectively, and X+Y=1. Similar to the first example, the initial embeddings 252a, 252c used to generate the real-time composite embedding(s) 260 are loaded from the associated database 32a, 32c. It will be appreciated that any combination of any number of initial embeddings 252a-252c may be specified by the composite embedding parameters 254 and generated by the embedding generation system.

In some embodiments, step 206 is performed in "real-time," e.g., at the same time as execution of a method selecting content from a predetermined pool using composite embeddings, such as method 100 discussed above. A real-time composite embedding generation process 200 may be executed by a suitable system, such as, for example, a composite embedding generation system 28. The real-time composite embedding generation process generates composite embeddings 260 for items in the pool of items 162a simultaneous with generation of an anchor embedding and comparison of the anchor embedding to the generated item embeddings.

Although the subject matter has been described in terms of claims should be construed broadly, to include other variants and embodiments, which may be made by those skilled in the art.

What is claimed is:

1. A system, comprising:
at least one processor; and
a non-transitory memory having instructions stored thereon wherein the instructions, when executed, cause the at least one processor to:
receive, from a user system over a network via a network interface, a target string;
obtain from an active database a set of common strings, wherein each string in the set of common strings represents a number of associated frequently used search queries that contains the respective string, and the set of common strings is updated periodically;
compare the target string to the set of common strings;
in accordance with a determination that the target string does not match any string in the set of common strings, generate an anchor embedding for the target string, wherein the anchor embedding is a composite embedding generated by concatenating:

at least a first initial embedding with a first number of dimensions and a second initial embedding with a second number of dimensions, wherein the first number is different from the second number;
obtain an item embedding for each item in a pool of items, wherein:
each item in the pool of items is associated with at least one string in the set of common strings;
a first plurality of item embeddings for the pool of items are pre-generated composite embeddings;
a second plurality of the item embeddings for the pool of items are generated by:
obtaining, from the database, a first set of composite embedding parameters, wherein the first set of composite embedding parameters identify the first initial item embedding with the first number of dimensions and associated first weights;
obtaining, from the database, a second set of composite embedding parameters, wherein the second set of composite embedding parameters identify the second initial item embedding with the second number of dimensions and associated second weights;
based on the first set of composite embedding parameters, generating a respective weighted first initial item embedding with the first number of dimensions by applying the first weights to the respective first initial item embedding;
based on the second set of composite embedding parameters, generating a respective weighted second initial item embedding with the second number of dimensions by applying the second weights to the respective second initial item embedding; and
concatenating the respective weighted first initial item embedding with the first number of dimensions and the respective weighted second initial item embedding with the second number of dimensions, wherein the respective weighted first initial item embedding and the respective weighted second initial item embedding are generated for the item, wherein;
the item embedding for each item in the pool of items is the same dimensions as the anchor embedding;
generate a similarity score for each item in the pool of items based on a single comparison of the item embedding to the anchor embedding;
select a set of items from the pool of items based on the generated similarity scores, wherein the set of items includes a predetermined number of items in the pool of items having a highest similarity score; and
transmit, over the network via the network interface, the selected set of items to populate elements of a user interface.

2. The system of claim 1, wherein the similarity score for each item in the pool of items is generated by a cosine similarity.

3. The system of claim 1, wherein the processor is configured to read the instructions to normalize the anchor embedding and each item embedding.

4. The system of claim 1, wherein the processor is configured to apply a set of weighting factors to the anchor embedding and each item embedding.

5. The system of claim 4, wherein the weighting factors are applied as a dot product.

6. The system of claim 1, wherein the item embedding for each item in the pool of items is generated substantially simultaneously with generating the anchor embedding for the target string.

7. The system of claim 1, wherein the first initial embedding and the first initial item embedding are generated using a first embedding model, and wherein the second initial embedding and the second initial item embedding are generated using a second embedding model.

8. The system of claim 1, the processor configured to read the instructions to:

in accordance with a determination that the target string matches a string in the set of common strings, obtain a target item embedding, wherein the target item embedding is the item embedding associated with the matching string; and generate a similarity score for each item in the pool of items based on a comparison of the item embedding to the target item embedding.

9. The system of claim 1, wherein the second plurality of item embeddings are generated substantially simultaneously with generating a similarity score for each item in the pool of items based on a comparison of the first plurality of item embeddings to the anchor embedding.

10. The system of claim 1, the processor configured to read the instructions to:

obtain a first set of composite embedding parameters, wherein the first set of composite embedding parameters identify the first initial item embedding with the first number of dimensions; and obtain a second set of composite embedding parameters, wherein the second set of composite embedding parameters identify the second initial item embedding with the second number of dimensions.

11. The system of claim 1, the processor configured to read the instructions to:

train the first initial embedding using a first embedding generation model, wherein the first embedding generation model is trained based on a first set of training data; and train the second initial embedding using a second embedding generation model, wherein the second embedding generation model is trained based on a second set of training data.

12. The system of claim 1, the processor further configured to read the instructions to display the set of items, wherein the predetermined number of items having the highest similarity score are displayed in order of similarity score.

13. A non-transitory computer readable medium having instructions stored thereon, wherein the instructions, when executed by a processor cause a device to perform operations comprising:

receiving, from a user system over a network via a network interface, a target string;

obtaining from an active database a set of common strings, wherein each string in the set of common strings represents a number of associated frequently used search queries that contains the respective string, and the set of common strings is updated periodically;

comparing the target string to the set of common strings;

in accordance with a determination that the target string does not match any string in the set of common strings, generating an anchor embedding for the target string, wherein the anchor embedding is a composite embedding generated by concatenating:

at least a first initial embedding with a first number of dimensions, and a second initial embedding with a second number of dimensions, wherein the first number is different from the second number;

obtaining an item embedding for each item in a pool of items, wherein:

each item in the pool of items is associated with at least one string in the set of common strings;

a first plurality of item embeddings for the pool of items are pre-generated composite embeddings;

a second plurality of the item embeddings for the pool of items are generated by: obtaining, from the database, a first set of composite embedding parameters, wherein the first set of composite embedding parameters identify the first initial item embedding with the first number of dimensions and associated first weights;

obtaining, from the database, a second set of composite embedding parameters, wherein the second set of composite embedding parameters identify the second initial item embedding with the second number of dimensions and associated second weights;

based on the first set of composite embedding parameters, generating a respective weighted first initial item embedding with the first number of dimensions by applying the first weights to the respective first initial item embedding;

based on the second set of composite embedding parameters, generating a respective weighted second initial item embedding with the second number of dimensions by applying the second weights to the respective second initial item embedding; and concatenating the respective weighted first initial item embedding with the first number of dimensions and the respective weighted second initial item embedding with the second number of dimensions, wherein the respective weighted first initial item embedding and the respective weighted second initial item embedding are generated for the item, wherein;

the item embedding for each item in the pool of items is the same dimensions as the anchor embedding;

generating a similarity score for each item in the pool of items based on a single comparison of the item embedding to the anchor embedding;

selecting a set of items from the pool of items based on the generated similarity scores, wherein the set of items includes a predetermined number of items in the pool of items having a highest similarity score; and transmitting, over the network via the network interface, the selected set of items to populate elements of a user interface.

14. The non-transitory computer readable medium of claim 13, wherein the similarity score for each item in the pool of items is generated by a cosine similarity.

15. The non-transitory computer readable medium of claim 13, wherein the device performs operations comprising normalizing the anchor embedding and each item embedding.

16. The non-transitory computer readable medium of claim 13, wherein the device performs operations comprising applying a set of weighting factors to the anchor embedding and each item embedding.

17. The non-transitory computer readable medium of claim 16, wherein the weighting factors are applied as a dot product.

18. The non-transitory computer readable medium of claim 13, wherein the item embedding for each item in the pool of items is generated substantially simultaneously with generating the anchor embedding for the target string.

19. A method by at least one processor, the method comprising:

receiving, from a user system over a network via a network interface, a target string;

obtaining from an active database a set of common strings, wherein each string in the set of common strings represents a number of associated frequently used search queries that contain the respective string, and the set of common strings is updated periodically such as one of every hour or every day;

comparing the target string to the set of common strings;

in accordance with a determination that the target string does not match any string in the set of common strings, generating an anchor embedding for the target string, wherein the anchor embedding is a composite embedding generated by concatenating:

at least a first normalized initial embedding with a first number of dimensions; and a second normalized initial embedding with a second number of dimensions, wherein the first number is different from the second number;

obtaining an item embedding for each item in a pool of items, wherein:

each item in the pool of items is associated with at least one string in the set of common strings;

a first plurality of item embeddings for the pool of items are pre-generated composite embeddings;

a second plurality of the item embeddings for the pool of items is generated by:

obtaining, from the database, a first set of composite embedding parameters, wherein the first set of composite embedding parameters identify the first initial item embedding with the first number of dimensions and associated first weights;

obtaining, from the database, a second set of composite embedding parameters, wherein the second set of composite embedding parameters identify the second initial item embedding with the second number of dimensions and associated second weights;

based on the first set of composite embedding parameters, generating a respective weighted first initial item embedding with the first number of dimensions by applying the first weights to the respective first initial item embedding;

based on the second set of composite embedding parameters, generating a respective weighted second initial item embedding with the second number of dimensions by applying the second weights to the respective second initial item embedding; and concatenating the respective weighted first normalized initial item embedding with the first number of dimensions and the respective weighted second normalized initial item embedding with the second number of dimensions, wherein the respective weighted first normalized initial item embedding and the respective weighted second normalized initial item embedding are generated for the item, wherein the item embedding for each item in the pool of items is the same dimensions as the anchor embedding;

generating, based on a single comparison, a cosine similarity score between each item embedding and the anchor embedding;

selecting a set of items from the pool of items based on the generated cosine similarity scores, wherein the set of items includes a predetermined number of items having a highest cosine similarity; and transmitting, over the network via the network interface, the selected set of items to populate elements of a user interface.

20. The method of claim 19, wherein the first normalized initial embedding and the first normalized initial item embedding are weighted by a first weighting factor, wherein the second normalized initial embedding and the second normalized initial item embedding are weighted by a second weighting factor, and wherein a sum of the first weighting factor and the second weighting factor is equal to one.

* * * * *